(12) United States Patent
Kröger et al.

(10) Patent No.: US 12,421,422 B2
(45) Date of Patent: Sep. 23, 2025

(54) POWDER BED 3D PRINTING PROCESS FOR PRODUCING ELASTIC SHAPED BODY COMPOSED OF SILICONES, AND SILICONE RESIN-CONTAINING POWDER SUITABLE FOR THE PROCESS

(71) Applicant: UNIVERSITÄT ROSTOCK, Rostock (DE)

(72) Inventors: Justin Jannis Kröger, Rostock (DE); Jörg Harloff, Kühlungsborn (DE); Axel Schulz, Rostock (DE); Hermann Seitz, Rostock (DE); Christian Polley, Rostock (DE)

(73) Assignee: UNIVERSITÄT ROSTOCK, Rostock (DE)

( * ) Notice: Subject to any disclaimer, the term of this patent is extended or adjusted under 35 U.S.C. 154(b) by 0 days.

(21) Appl. No.: 18/282,293

(22) PCT Filed: Mar. 14, 2022

(86) PCT No.: PCT/EP2022/056475
§ 371 (c)(1),
(2) Date: Sep. 26, 2023

(87) PCT Pub. No.: WO2022/194748
PCT Pub. Date: Sep. 22, 2022

(65) Prior Publication Data
US 2025/0129264 A1    Apr. 24, 2025

(30) Foreign Application Priority Data

Mar. 16, 2021  (DE) .................. 10 2021 106 369.8

(51) Int. Cl.
*B29C 64/165*    (2017.01)
*B33Y 70/00*     (2020.01)
(Continued)

(52) U.S. Cl.
CPC ............ *C09D 183/06* (2013.01); *B33Y 70/00* (2014.12); *C08G 77/08* (2013.01); *C08G 77/18* (2013.01);
(Continued)

(58) Field of Classification Search
CPC ...... C09D 183/06; B33Y 70/00; B33Y 10/00; C08G 77/08; C08G 77/18; C08G 77/20;
(Continued)

(56) References Cited

U.S. PATENT DOCUMENTS 5,527,873 A    6/1996   Kobayashi et al.
5,684,112 A    11/1997  Berthiaume et al.
(Continued)

FOREIGN PATENT DOCUMENTS

WO    2016/044547 A1    3/2016
WO    2016/071241 A1    5/2016
(Continued)

OTHER PUBLICATIONS

International Search Report dated Jun. 28, 2022, in connection with PCT International Application No. PCT/EP2022/056475.
(Continued)

*Primary Examiner* — Nahida Sultana
(74) *Attorney, Agent, or Firm* — Norris McLaughlin, PA

(57) ABSTRACT

Powder bed 3D printing processes for producing elastic molded silicone articles and silicone resin-containing powders suitable for the processes are provided. The processes comprise: a) layer-by-layer spreading of a powder in a powder bed 3D apparatus, wherein the powder contains a silicone resin of formula (I); b) applying a crosslinker solution to the layer of a) according to a printing pattern for the elastic molded article, wherein the crosslinker solution comprises a hydrosilylation catalyst and a silicone oil of the general formula (II); c) repeating a) and b) according to the
(Continued)

printing pattern for the elastic molded body; and d) removing of the non-crosslinked powder.

10 Claims, 1 Drawing Sheet

(51) Int. Cl.
*C08G 77/08* (2006.01)
*C08G 77/18* (2006.01)
*C08G 77/20* (2006.01)
*C09D 183/06* (2006.01)
*B29K 83/00* (2006.01)
*B29K 105/00* (2006.01)
*B29K 105/24* (2006.01)
*B33Y 10/00* (2015.01)
*C08G 77/00* (2006.01)

(52) U.S. Cl.
CPC ............ *C08G 77/20* (2013.01); *B29C 64/165* (2017.08); *B29K 2083/00* (2013.01); *B29K 2105/24* (2013.01); *B29K 2105/251* (2013.01); *B29K 2995/0088* (2013.01); *B29K 2995/0094* (2013.01); *B33Y 10/00* (2014.12); *C08G 77/70* (2013.01)

(58) Field of Classification Search
CPC ...... C08G 77/70; C08G 77/12; B29C 64/165; B29K 2083/00; B29K 2105/24; B29K 2105/251; B29K 2995/0088; B29K 2995/0094; C08L 83/04
See application file for complete search history.

(56) References Cited

U.S. PATENT DOCUMENTS

| | | |
|---|---|---|
| 5,760,116 A | 6/1998 | Kilgour |
| 10,471,653 B2 | 11/2019 | Selbertinger et al. |
| 10,676,641 B2 | 6/2020 | Achenbach et al. |
| 11,958,240 B2* | 4/2024 | Negri Jimenez .... C09D 11/322 |
| 2009/0093605 A1 | 4/2009 | Ramdani et al. |
| 2016/0263827 A1 | 9/2016 | Fripp |
| 2018/0208797 A1 | 7/2018 | Achenbach et al. |
| 2023/0115347 A1* | 4/2023 | Lu ......................... B33Y 40/20 264/6 |

FOREIGN PATENT DOCUMENTS

| | | |
|---|---|---|
| WO | 2017/089496 A1 | 6/2017 |
| WO | 2017/040874 A1 | 3/2019 |

OTHER PUBLICATIONS

English translation of International Search Report dated Jun. 28, 2022, in connection with PCT International Application No. PCT/EP2022/056475.
Written Opinion in connection with PCT International Application No. PCT/EP2022/056475.

* cited by examiner

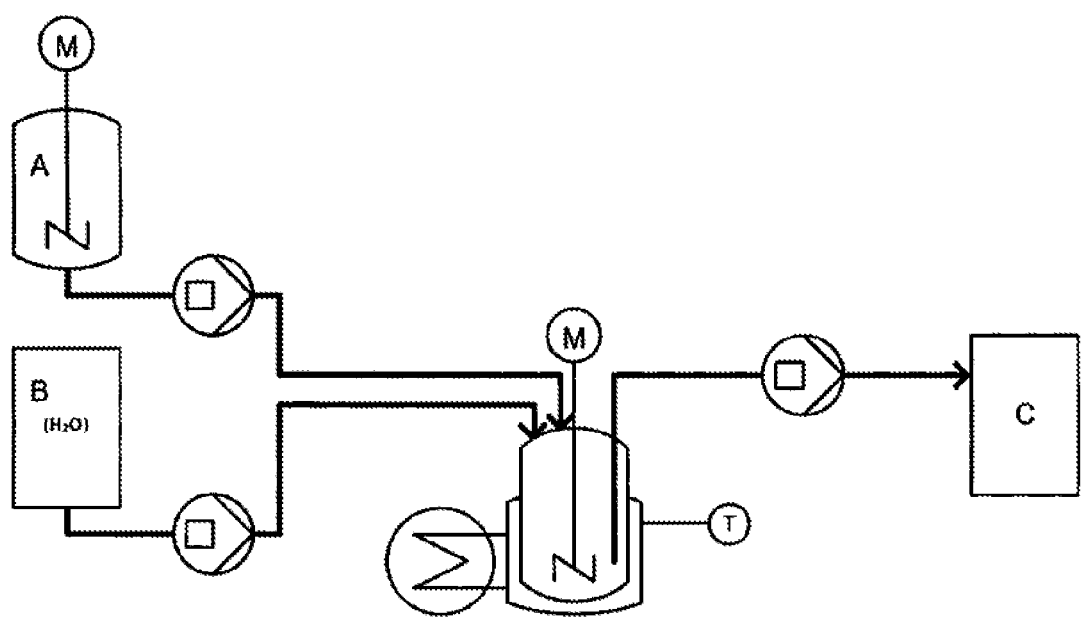

POWDER BED 3D PRINTING PROCESS FOR PRODUCING ELASTIC SHAPED BODY COMPOSED OF SILICONES, AND SILICONE RESIN-CONTAINING POWDER SUITABLE FOR THE PROCESS

This application is the 371 U.S. National Stage of International Application No. PCT/EP2022/056475, filed Mar. 14, 2022, which claims foreign priority benefits under 35 U.S.C. § 119 of German Application No. 10 2021 106 369.8, filed Mar. 16, 2021, the disclosures of which are incorporated herein by reference.

The invention relates to a powder bed 3D printing process for producing elastic molded articles from silicones and to a silicone resin-containing powder suitable for the process.

TECHNOLOGICAL BACKGROUND 3D printing, also known as additive manufacturing, is a manufacturing process in which material is applied layer by layer to create three-dimensional objects (workpieces). In this process, the layer-by-layer buildup is computer-controlled from one or more liquid or solid materials according to specified dimensions and shapes. Typical materials for 3D printing are plastics, synthetic resins, ceramics and metals.

In 3D printing using the powder bed 3D printing process variant, the building material is present in powder form in its raw state. An example of a powder 3D printing process is the so-called binder jetting process, in which a powdery starting material is bonded with a binder at selected points in order to produce workpieces. Powder bed 3D printing processes are currently used primarily for the rapid printing of inelastic objects.

3D printing of elastic materials based on silicones has so far been possible only to a very limited extent. US 2016/0263827 A1 describes a process in which a crosslinking catalyst is added to a bath of liquid silicone via a metering needle that is movable in three-dimensional space and leads to local crosslinking. The crosslinked component is then mechanically removed from the bath and reprocessed. This process is limited to soft silicones with Shore A less than 50 and does not permit assembly from several materials.

WO 2017/040874 A1 describes a process in which silicone is extruded from a nozzle that is moved in three-dimensional space. The silicone can be thermally cross-linked in the process. However, the extrusion process is only suitable for very simple geometries.

A process for 3D printing silicones using the so-called "drop-on-demand" process (DOD process) is described in WO 2016/071241 A1. In drop-on-demand printing, the pasty silicone material is ejected in the form of droplets from a dispensing valve. This process is suitable for printing a silicone material and, if necessary, support material. WO 2017/089496 A1 relates to highly viscous crosslinkable silicone rubber compositions whose properties enable the production of elastomeric moldings by the DOD process. However, the DOD process is technically very complex and the production speed is comparatively low, so that broad industrial application is not currently possible.

WO2016/044547A1 discloses a 3D printing process in which a light-curable silicone mixture is printed and then exposed to light. The mixture contains: A) an organosilicon compound (A) having an average of at least 2 Si-bonded ethylene groups per molecule separated by at least 4 Si atoms; B) an organosilicon compound (B) having an average of at least 2 Si-bonded hydrogen atoms per molecule and in an amount sufficient to cure; and C) a light-activated hydrosilylation catalyst. The mixture is applied as a liquid or paste, including in conjunction with a powder bed 3D printing process. Elastic articles can be obtained using a linear or branched compound (A) or (B) with D units, respectively. The H or ethylene function of compounds (A) or (B) can be terminally bonded. The ethylene function of compounds (A) may be vinyl.

Powder bed 3D printing processes for workpieces made of elastic silicones have not yet been developed.

SUMMARY OF THE INVENTION

The invention relates to the first use of the powder bed 3D printing process for the production of elastic molded silicone articles and comprises the steps:

a) Layer-by-layer spreading of a powder in a powder bed 3D apparatus, wherein the powder contains a silicone resin of formula (I):

$$M_y M'_z D_a T_b Q_c \qquad (I)$$

with
$M=[R_3SiO_{1/2}]$
$M'=[R'R_2SiO_{1/2}]$
$D=[R_2SiO_{2/2}]$
$T=[RSiO_{3/2}]$
$Q=[SiO_{4/2}]$
wherein each R is independently C1-C10 alkoxy, C1-C10 alkyl C6-C10 aryl or hydroxy,
and
R'=H is
and where for the indices
y=0 to 400 (preferably 0 to 200)
z=2 to 440 (preferably 2 to 220)
a=0 to 60 (preferably 0 to 30)
b=0 to 40 (preferably 0 to 20)
c=6 to 400 (preferably 6 to 200)
400≥a+b+c≥9 (preferably 200≥a+b+c≥9)
and
(z+y)/(a+b+c)=0.3 to 1.1 (preferably 0.3 to 1.0);

b) applying a crosslinker solution to the layer of step a) according to a printing pattern for the elastic molded article, wherein the crosslinker solution comprises a hydrosilylation catalyst and a silicone oil of the general formula (II):

$$M_a M'_b D_c D'_d \qquad (II)$$

with
$M=[R_3SiO_{1/2}]$
$M'=[R'R_2SiO_{1/2}]$
$D=[R_2SiO_{2/2}]$
$D'=[R'RSiO_{2/2}]$
wherein each R is independently C1-C10 alkyl or C6-C10 aryl, and
R' stands for vinyl
and where for the indices
a=0 to 2
b=0 to 2 (especially b=2)
c=8 to 500 (especially 50 to 250)
d=0 to 20 (especially d=0)
a+b=2 and
b+d≥2;

c) repeating steps a) and b) according to the printing pattern for the elastic molded body;
and
d) removing of the non-crosslinked powder.

The molded article obtained from step d) can then be post-treated with the crosslinker solution described in step b). In addition, post-treatment of the molded article with organic solvent such as ethanol can be carried out, whereby excess powder is removed from the molded article.

Accordingly, in the powder bed 3D printing process, elastic objects are printed using a specially produced powdered silicone resin in combination with a crosslinker solution. Until now, the powder bed 3D printing process has only excelled in the rapid printing of inelastic objects. By means of the invention, larger elastic objects can also be produced quickly and cost-effectively for the first time. The process can be used on industrial printers and thus enables the printing of objects in large quantities as well as objects on a meter scale. Pure silicones are also used. Thus, for example, no photolytic functionalities are required in the silicone for crosslinking, as is the case with stereolithographic processes. This means that the properties of the silicone are fully reflected in the printed objects.

During printing, a layer of the silicone resin is spread in a powder bed and cured with the crosslinker solution, which is applied site-selectively in xy planes with a heatable single-drop or multijet system. The crosslinker solution can thus be applied site-selectively in xy planes from one or more single drops or via multijet print heads. Using the multijet system, significantly higher productivity can be achieved than with the single-drop system. The powder bed is then lowered in the z-plane, another layer of powder is applied over the previous one and crosslinked again with the crosslinker solution at specific points. This procedure is repeated layer by layer until the finished object is obtained. The non-crosslinked silicone resin acts as a support structure, so no additional support matrix needs to be printed. At the end of the printing process, the non-crosslinked silicone resin powder can simply be removed with compressed air. This separated powder can be almost completely recycled for subsequent prints. Finally, the surface of the elastic molded part can be posttreated with the crosslinker solution by means of an immersion/dipping process, brushing or infiltration and thus smoothed or strengthened. Surface smoothing can also be achieved by post-treatment with an organic solvent such as toluene, xylene or ethanol. A final thermal post-treatment can also further strengthen the printed molded part and remove possible residual volatile components such as solvents.

Preferably, in the silicone resin of formula (I) R stands for methyl and/or ethoxy and/or hydroxy. The powder with the silicone resin of formula (I) preferably has a mean particle diameter D50 in the range from 5 to 250 μm. The particle size is determined by measuring the angular dependence of the intensity of scattered light from a laser beam passing through a dispersed particle sample (measurement according to ISO13320 (2009)).

Preferably, one or more of the indices of the silicone resin of formula (I) are set as follows: $y=0$ to 200, $z=2$ to 220, $a=0$ to 30 $b=0$ to 20, $c=6$ to 200, $200 \geq a+b+c \geq 9$, $z/y=0.2$ to 10, and $(z+y)/(a+b+c)=0.3$ to 1.0. Particularly preferably, all of the indices are within said preferred limits.

By means of the spray drying process, the flow properties can be optimized for the process. For this purpose, the silicone resin is dissolved in an organic solvent such as ethyl acetate or ethanol. The 8 to 70% silicone resin solution is introduced at a flow rate of 5 to 30 mL/min and sprayed by means of an $N_2$ flow of 300 to 700 L/h. The silicone resin is then dried in a spray dryer. The inlet temperature is set between 90 and 180° C. and the flow rate of the aspirator between 20 and 35 m$^3$/h. As a result, outlet temperatures between approximately 40 to 90° C. are obtained. The fine powder obtained, consisting of spherical particles, significantly improves the rheological properties of the resin. This leads to improved spreading properties and thus to a uniform and fine powder bed, allowing smooth contours and very high resolutions to be achieved. In addition to the silicone oil (preferably 80-98 wt. % of the solution), the catalyst (preferably 5-450 ppm), the crosslinker solution contains a nonpolar solvent (preferably 2-20 wt. % of the solution). The solvent is, for example, toluene or xylene. For example, the crosslinker solution was composed of 90.0% of the silicone oils with terminal vinyl groups, 150 ppm of the Karstedt catalyst and 9.95% of a nonpolar solvent such as toluene, xylene, 1-heptanol, cyclohexanone or pentylacetate.

It is also preferred if R is methyl in the silicone oil of the formula (II). The silicone oil of formula (II) can also have an average molecular weight in the range from 3000 to 30000 g/mol. Depending on the molecular weight or chain length of the silicone oil used, different elasticities can be set for the crosslinking products. It is also preferable if $d=0$ and $b=2$ in the silicone oil of formula (II). In addition or as an alternative, $c=50$ to 250 in the silicone oil of formula (II).

The hydrosilylation catalyst is preferably 1,1,3,3-tetramethyl-1,3-divinyldisiloxane platinum (Karstedt catalyst).

In the repeating step a), powders with different compositions can be used. Alternatively or additionally, crosslinker solutions with different compositions can be used in the repeating step b). Accordingly, molded bodies with anisotropic material properties can also be produced in this way using the 3D printing process. For example, different crosslinker solutions consisting of silicone oils with different chain lengths can be used and thus solids with different elasticities (anisotropic material properties) can be printed. Multicolored objects can also be produced, for example, by introducing dyes (such as color pigments like iron oxide) into the crosslinker solution. The two examples mentioned can best be implemented by using several jetting systems. Likewise, it is conceivable to create conductive and semiconductive bodies by adding conductive and semiconductive additives, for example nanoparticles of graphite or graphene nanotubes (with, for example, TUBALL™ graphene nanotubes, TUBALL™ Matrix 601 or TUBALL™ Matrix 601 from the company OCSiAl). This enables, for example, the printing of conductive traces within a completely flexible object. Accordingly, the powder used in the process can have other components in addition to the silicone resin, such as dyes, conductive particles or fillers (such as fumed $SiO_2$, to strengthen the mechanical properties). The proportion of silicone resin is preferably >40 wt. %, in particular >50 wt. % of the powder. Alternatively or additionally, other components, such as dyes, conductive or semiconductive substances, can also be added to the crosslinker solution. These components are present in particular in solution or as a dispersion in the crosslinker solution. The proportion of the components in the crosslinker solution is preferably <10 wt. %, in particular <5 wt. %. Alternatively, the dyes, conductive or semiconductive substances can also be added to the powder in a proportion of preferably <10 wt. %, in particular <5 wt. %.

There are a large number of application areas for the process. These range from healthcare, the sports industry and the consumer sector to technical areas such as mechanical engineering and vehicle construction. The process can be used both for the production of prototypes and for series production, especially of individualized end products. In industrial use, the process is suitable for printing elastic objects because it is cost-effective and comparatively fast.

Another aspect of the invention relates to a powder comprising a silicone resin of formula (I):

$$M_y M'_z D_a T_b Q_c \quad (I)$$

with
M=$[R_3SiO_{1/2}]$
M'=$[R'R_2SiO_{1/2}]$
D=$[R_2SiO_{2/2}]$
T=$[RSiO_{3/2}]$
Q=$[SiO_{4/2}]$
wherein each R is independently C1-C10 alkoxy, C1-C10 alkyl, C6-C10 aryl or hydroxy, and
R'=H is
and where for the indices
y=0 to 400 (preferably 0 to 200)
z=2 to 440 (preferably 2 to 220)
a=0 to 60 (preferably 0 to 30)
b=0 to 40 (preferably 0 to 20)
c=6 to 400 (preferably 6 to 200)
400≥a+b+c≥9 (preferably 200≥a+b+c≥9)
and
(z+y)/(a+b+c)=0.3 to 1.1 (preferably 0.3 to 1.0).

Further preferred embodiments of the invention are apparent from the subclaims and the following description.

BRIEF DESCRIPTION OF THE DRAWINGS

The invention is explained in more detail below with reference to examples of embodiments and an associated drawing. The single figure shows:

FIG. 1 a schematic diagram of the experimental setup for the preparation of the silicone resins of formula (I) according to the invention.

DETAILED DESCRIPTION OF THE INVENTION

A powder bed 3D printing process for the fabrication of elastic molded silicone articles is described in more detail below. The process comprises the steps:

a) Layer-by-layer spreading of a powder in a powder bed 3D apparatus, wherein the powder contains a silicone resin of formula (I):

$$M_y M'_z D_a T_b Q_c \quad (I)$$

with
M=$[R_3SiO_{1/2}]$
M'=$[R'R_2SiO_{1/2}]$
D=$[R_2SiO_{2/2}]$
T=$[RSiO_{3/2}]$
Q=$[SiO_{4/2}]$
where each R is independently C1-C10 alkoxy (in particular ethoxy), C1-C10 alkyl (in particular methyl), C6-C10 aryl (in particular phenyl) or hydroxyl, and
R'=H is
and where for the indices
y=0 to 400 (preferably 0 to 200)
z=2 to 440 (preferably 2 to 220)
a=0 to 60 (preferably 0 to 30)
b=0 to 40 (preferably 0 to 20)
c=6 to 400 (preferably 6 to 200)
400≥a+b+c≥9 (preferably 200≥a+b+c≥9)
and
(z+y)/(a+b+c)=0.3 to 1.1 (preferably 0.3 to 1.0);

b) applying a crosslinker solution to the layer of step a) according to a printing pattern for the elastic molded article, wherein the crosslinker solution comprises a hydrosilylation catalyst and a silicone oil of the general formula (II):

$$M_a M'_b D_c D'_d \quad (II)$$

with
M=$[R_3SiO_{1/2}]$
M'=$[R'R_2SiO_{1/2}]$
D=$[R_2SiO_{2/2}]$
D'=$[R'RSiO_{2/2}]$
where each R is independently C1-C10 alkyl or C6-C10 aryl (in particular methyl), and
R' stands for vinyl
and where for the indices
a=0 to 2
b=0 to 2 (especially b=2)
c=8 to 500 (especially 50 to 250)
d=0 to 20 (especially d=0)
a+b=2 and
b+d≥2;

c) repeating steps a) and b) according to the printing pattern for the elastic molded body;
and
d) removing of the non-crosslinked powder.

The molded article obtained from step d) can then be post-treated with the crosslinker solution described in step b). In addition, post-treatment of the molded article with organic solvent such as ethanol can be carried out, whereby excess powder is removed from the molded article.

The silicone fluids used in step b) and, if necessary, in the post-treatment are commercially available (e.g., from Gelest, Inc. under the trade name DMS-V22) or accessible via common silicone chemistry processes.

A. Preparation of Silicone Resins

The silicone resins with hydrido functions from step a) can be prepared analogously to known synthesis methods of silicone resins, as shown below. Alternatively, synthesis via sodium silicates is conceivable (see US 2009/0093605 A1). Functionalization of MQ silicone resins with hydrido functions is also possible (cf. U.S. Pat. No. 5,527,873 A).

A.1 General Synthesis Rule

The synthesis can be carried out in a manner known per se via a hydrolysis-condensation reaction. For this purpose, reactive silanes with 2 to 4 C1-C10 alkoxy groups (component A), such as tetraethoxysilane Si(OEt)$_4$, chlorosilanes with 3 C1-C10 alkyl or C6-C10 aryl groups (component B), such as trimethylchlorosilane Me$_3$SiCl, and hydridochlorosilanes containing 2 C1-C10 alkyl or C6-C10 aryl groups (component C), such as dimethylchlorosilane HMe$_2$SiCl, are reacted with one another according to the following scheme:

$$x \; EtO-\underset{\underset{OEt}{|}}{\overset{\overset{OEt}{|}}{Si}}-OEt \;+\; y \; Me-\underset{\underset{Me}{|}}{\overset{\overset{Me}{|}}{Si}}-Cl \;+\; z \; H-\underset{\underset{Me}{|}}{\overset{\overset{Me}{|}}{Si}}-Cl \xrightarrow[-EtOH\;-HCl]{+H_2O} R_aO-\underset{\underset{OR_a}{|}}{\overset{\overset{OR_a}{|}}{Si}}-OR_a$$

$$R_a = \underset{\underset{OR_b}{|}}{\overset{\overset{OR_b}{|}}{-Si-OR_b}} \; or \; \underset{\underset{Me}{|}}{\overset{\overset{Me}{|}}{-Si-Me}} \; or \; \underset{\underset{Me}{|}}{\overset{\overset{Me}{|}}{-Si-H}} \; or \; -Et \; or \; -H$$

$R_b$ represents a variation of different residues resulting from the reactants used and their condensation products. In the above example, this includes ethyl groups or further silicone building blocks such as —Si(OEt)$_2$—OSi(OH)(OSiMe)$_{32}$.

For synthesis, ratios of z/y=0.5 to y=0 (for example, z/y=0.77) and (z+y)/x=0.5 to 1.1 (preferably 0.6 to 1.0) (for example, (z+y)/x=0.99) are specified.

For example, a mixture of the three silanes (V=approximately 20 mL) and 140 ml of ethyl acetate was transferred to a reactor at a flow rate of 20 mL/min. Also, 20 mL of H$_2$O was added at a flow rate of 2.5 mL/min (flow rate ratio of silane mixture to water at 8:1 ratio). The reaction mixture was tempered to 60° C. and mixed vigorously with a KPG stirrer (glass blade stirrer). At 22.5 mL/min, the reaction product was continuously removed from the reaction flask (reactor). In this process, the approximate residence time was 2.5 min. The reaction solution was washed with water (four times at 50 mL each) to remove the acids formed (HCl and also small amounts of acetic acid). Subsequently, the solvent was removed by rotary evaporator and vacuum drying. Yields of over 90% were obtained.

FIG. 1 shows a schematic diagram of the experimental setup. Container A contains a mixture of the three components A, B and C, which is kept in motion by the stirrer motor M. The mixture is kept in motion by the stirrer motor M. The mixture is kept in motion by the stirrer motor M. Container B contains water. Via pump lines, both components are synchronously pumped into a reactor with a temperature control unit T and kept in motion by a further stirrer motor M. The silicone resin obtained is continuously pumped into the reactor. The silicone resin obtained is continuously transferred to a further container C.

Properties of the resin, such as softening point or elasticity after crosslinking, can be achieved, for example, by varying the mixing ratios of components A to C within the specified limits or by varying the reaction parameters, e.g. via temperature, mixing, concentrations (such as solvent amount) or flow rates. Furthermore, the substituents of the silanes used can also be varied. For example, it is also possible to use a mixture of different dialkyl/or diaryl chlorohydridosilanes as component C or a mixture of different trialkyl/or triarylchlorosilanes as component B. Instead of the tetraethoxysilane used as an example, other tetraalkoxysilanes can also be used as component A. Also, instead of 4 alkoxy groups in component A, 1 or 2 other substituents independently of one another selected from the group comprising C1-C10 alkyl and C6-C10 aryl may be present.

As another example, the synthesis over disiloxanes, such as tetramethyldisiloxane and hexamethyldisiloxane, with tetraethoxysilane Si(OEt)$_4$ can be done by acid catalysis. Here, the synthesis is carried out using a batch approach. For this purpose, reactive silanes with 2 to 4 C1-C10 alkoxy groups (component A; the proportion of silanes with 2 and 3 alkoxy groups can be <15%), such as for example tetraethoxysilane Si(OEt)$_4$, disiloxanes with 6 C1-C10 alkyl or C6-C10 aryl groups (component D), such as for example hexamethyldisiloxane Me$_6$Si$_2$O, and disiloxanes with at least one (preferably at least 2) hydrido function with at most 6 (preferably at most 4, particularly preferably with the number of 2 hydrido functions) C1-C10 alkyl or C6-C10aryl groups (component E), such as for example 1,1,3,3-tetramethyldisiloxane H$_2$Me$_4$Si$_2$O, are reacted with one another according to the following scheme:

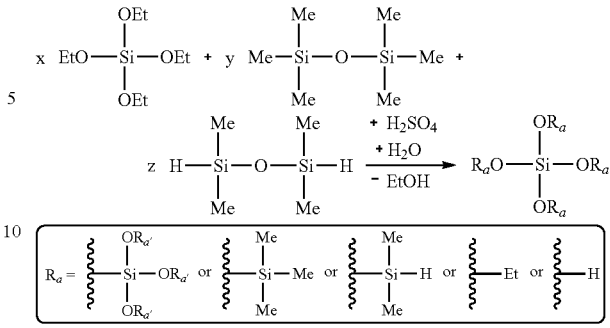

$R_b$ represents a variation of different residues resulting from the reactants used and their condensation products. In the above example, this includes ethyl groups or further silicone building blocks such as —Si(OEt)$_2$—OSi(OH)(OSiMe)$_{32}$.

For synthesis, ratios of z/y=0.1 to y=0 (for example, z/y=0.61) and (z+y)/x=0.4 to 1.1 (for example, (z+y)/x=1.00) are specified.

For example, 10-80 mL of ethanol containing 20-55 mL of H$_2$O was placed in a 500 mL three-neck flask, tempered to 50° C., 0.005-0.03 mL of conc. H$_2$SO$_4$ and then approximately 290 mmol of component A was added. The mixture was mixed for 2-6 h using a KPG stirrer (paddle stirrer). A mixture of components D and E and 50-100 mL of a solvent such as ethyl acetate or toluene was added to the reaction flask. Additionally, 0.5-3 mL of conc. H$_2$SO$_4$ was added. Then, different temperature programs were carried out with further stirring. For example, 1 h at 60° C., 1 h at 70° C., and 2 h at 80° C. The workup procedure was the same as in the previous example. Also in this example, the properties of the resin, such as softening point or elasticity after crosslinking, can be adjusted, for example, by varying the mixing ratios of components A, D and E within the specified limits or by varying the reaction parameters, for example, via temperature, temperature profile, mixing, concentrations (such as solvent amount). Furthermore, the substituents of the silanes or disiloxanes used can also be varied analogously to the first-mentioned example. For example, it is also possible to use as components D and E a mixture of different disiloxanes with different alkyl/or aryl groups, and for component E, for example, also to use a mixture of different disiloxanes with different numbers (1 to 6; preferably 2) of hydrido functions. Instead of the tetraethoxysilane used as an example, other tetraalkoxysilanes can also be used as component A. Also, instead of 4 alkoxy groups in component A, 1 or 2 other substituents independently selected from the group comprising C1-C10 alkyl and C6-C10 aryl may be present.

The resins prepared exhibit very good solubility in organic solvents, such as toluene, xylene, 1-heptanol, cyclohexanone, and pentylacetate, and are also readily soluble in ethanol. Average molecular weights of about 750 to 25000 g/mol and a molecular weight distribution (PDI) of about 1.1 to 6.0 were determined by GPC. In addition, the syntheses yielded resins with a hydrido functional ratio of 8 to 30 mol %, and this ratio was determined by $^1$H NMR spectroscopy. This ratio was found to be particularly suitable in crosslinking tests. Also, $^1$H-(with addition of a standard) and $^{29}$Si (IG) NMR spectroscopy were used to determine the proportions of the functional units and thus the M'/M and (M+M')/(D+T+Q) or (M+M')/(T+Q) ratios of the silicone resins.

EXAMPLE A1

The silane-solvent mixture (SLG), consisting of 140 mL of ethyl acetate, 36.19 g (173.7 mmol) of tetraethoxysilane (TEOS), 7.80 g (71.80 mmol) of trimethylchlorosilane (TMCS), and 4.57 g (48.34 mmol) of dimethylchlorosilane (DMCS), was mixed well in an Erlenmeyer flask with a stirring fish. Thus, a DMCS/TMCS ratio of 0.67 and a (DMCS+TMCS)/TEOS ratio of 0.69 were used. In a 500 mL three-neck flask tempered to 60° C. and equipped with a KPG stirrer (paddle stirrer) and a Dimroth cooler, the SLG and deionized water were introduced using peristaltic pumps. A flow rate of 10 mL/min was selected for the SLG and a flow rate of 1.25 mL/min was selected for the deionized water. 5 min after the start of simultaneous introduction of water and SLG, the reaction solution was transferred to a collection vessel using a third peristaltic pump at a flow rate of 11.25 mL/min. Simultaneously, the SLG and water peristaltic pumps were turned off when the SLG was empty. In a separatory funnel, the reaction solution from the collection vessel was washed five times with approximately 40 mL of deionized water to remove the resulting acids (hydrochloric acid and traces of acetic acid). The solvent was then removed using a rotary evaporator and concentrated to dryness in vacuo. A yield of 18.0 g (92.3%) was obtained.

By ATR-IR measurement, a characteristic Si—H vibration was detected at 2140 cm$^{-1}$ and two characteristic C—H vibrations were detected at 2900 and 2960 cm$^{-1}$. In addition, a broad band of Si—OH groups as well as water extending from 3100 to 3700 cm$^{-1}$ can be seen. Using $^1$H NMR spectroscopy, the signals from the hydrido (5.05 ppm in C $D_{66}$) and methyl groups (0.77 to 0.00 ppm in C $D_{66}$) were quantitatively measured, resulting in a 0.18 to 3 ratio of hydrido to methyl groups. In addition, a $^1$H-NNR was recorded from the resin using a standard (cyclohexane) to determine the unit ratios of the resin: M'/M=1.0 and (M+M')/(D+T+Q)=0.5. Using the $^{29}$Si (IG) NMR spectroscopy, the functional units were assigned to the signals as described in formula (I): M units 12.4 ppm, M' units −1.6 ppm, T units −100.5 ppm, and Q units −109.1 ppm. A signal of D units could not be determined. In addition, a M'/M ratio of 0.7 and a (M+M')/(T+Q) ratio of 0.7 were determined via integration of the signals. Gel permeation chromatography (GPC) determined the average molecular weights $M_n$ ("number-average")=799 g/mol and $M_w$ ("weight-average") =1048 g/mol, and a molecular weight distribution (PDI) of 1.31. The silicone resin had a softening point of 94.7 to 111.1° C.

EXAMPLE A2

The same setup as in Example 1 was used. The SLG consisted of 140 mL ethyl acetate, 13.90 g (66.74 mmol) TEOS, 3.66 g (33.69 mmol) TMCS, and 2.16 g (22.87 mmol) DMCS. Thus, a DMCS/TMCS ratio of 0.69 and a (DMCS+TMCS)/TEOS ratio of 0.86 were used. A flow rate of 16.4 mL/min was chosen for the SLG and a flow rate of 1.25 mL/min was chosen for the deionized water. 5 min after the start of simultaneous introduction of water and SLG, the peristaltic pumps were transferred to a collection vessel for discharge of the reaction solution at a flow rate of 10.25 mL/min. When the SLG was empty, the peristaltic pumps of the SLG and water were turned off. The workup was performed as in Example A1. A yield of 7.9 g (95.2%) was obtained.

In an ATR-IR measurement, bands with the same wavenumbers as in Example 1 were determined for the hydrido, methyl and hydroxy groups as well as water. Using $^1$H-NMR spectroscopy, the signals from the hydrido (5.03 ppm in C $D_{66}$) and methyl groups (0.79 to −0.14 ppm in C $D_{66}$) were quantitatively measured, resulting in a 0.18 to 3 ratio of hydrido to methyl groups. In addition, a $^1$H-NNR was recorded from the resin using a standard (cyclohexane) to determine the unit ratios of the resin: M'/M=0.7 and (M+M')/(D+T+Q)=0.9. Using the $^{29}$Si(IG) NMR spectroscopy, the functional units were assigned to the signals as described in formula (I): M units 12.3 ppm, M' units −2.0 ppm, T units −100.1 ppm, and Q units −107.6 ppm. A signal of D units could not be determined. In addition, a M'/M ratio of 0.7 and a (M+M')/(T+Q) ratio of 0.9 were determined via integration of the signals. Gel permeation chromatography (GPC) determined the average molecular weights of $M_n$=1543 g/mol and $M_w$=2469 g/mol and a PDI of 1.60. The silicone resin possessed a softening point of 66.6 to 86.3° C.

EXAMPLE A3

As a reaction flask, a 500 mL three-neck flask was tempered to 60° C. and equipped with a KPG stirrer (wing stirrer) and a Dimroth condenser. To this reaction flask, 70 mL of ethyl acetate was added. Then, 6.10 g (29.26 mmol) of TEOS, 1.86 g (17.07 mmol) of TMCS, 1.21 g (12.82 mmol) of DMCS, and then 10 g of deionized water were quickly added. Thus, a DMCS/TMCS ratio of 0.75 and a (DMCS+TMCS)/TEOS ratio of 1.02 were used. The reaction was kept at 60° C. for 2 min with vigorous mixing of the KPG stirrer and then cooled to room temperature with a cold water bath. The workup procedure was the same as in Example A1. A yield of 3.6 g (90.1%) was obtained.

ATR-IR measurement determined bands for the hydrido, methyl and hydroxy groups and water with the same wavenumbers as in Example 1. Mittles $^1$H-NMR spectroscopy was used to quantitatively measure the signals from the hydrido (5.04 ppm in C $D_{66}$) and methyl groups (0.86 to 0.01 ppm in C $D_{66}$), resulting in a 0.17 to 3 ratio of hydrido to methyl groups. In addition, a $^1$H-NNR was recorded from the resin using a standard (cyclohexane) to determine the unit ratios of the resin: M'/M=0.8 and (M+M')/(D+T+Q) =0.6. Using the $^{29}$Si (IG) NMR spectroscopy, the functional units were assigned to the signals as described in formula (I): M units 12.4 ppm, M' units −1.6 ppm, T units −100.7 ppm, and Q units −109.6 ppm. A signal of D units could not be determined. In addition, a M'/M ratio of 0.8 and a (M+M')/(T+Q) ratio of 0.9 were determined via integration of the signals. Gel permeation chromatography (GPC) determined the average molecular weights of $M_n$=182 g/mol and $M_w$=879 g/mol and a PDI of 4.83. The silicone resin did not possess a softening point up to 270° C.

EXAMPLE A4

A 500 mL three-neck flask was tempered to 50° C. with a KPG stirrer (paddle stirrer) as well as a Dimroth condenser and with an oil bath. 80 mL ethanol, 55 mL $H_2O$, 0.03 mL conc. $H_2SO_4$ were added followed by 60.3 g (0.289 mol) TEOS. The mixture was stirred for 2.5 h at 50° C. Then, a mixture of 14.630 g (90.1 mmol) hexamethyldisiloxane, 7.337 g (54.6 mmol) 1,1,3,3-tetramethyldisiloxane and 90 mL toluene was added to the flask. Then 3 mL conc. $H_2SO_4$ was added. The mixture was further stirred for 1 h at 60° C., 1 h at 70° C., and 2 h at 80° C. The workup procedure was as in Example A1. A yield of 36.9 g (93.9%) was obtained.

In an ATR-IR measurement, bands with the same wavenumbers as in Example 1 were determined for the hydrido, methyl and hydroxy groups as well as water. Using $^1$H-NMR spectroscopy, the signals from the hydrido (5.00 ppm in C $D_{66}$) and methyl groups (0.78 to 0.00 ppm in C $D_{66}$) were quantitatively measured, resulting in a 0.13 to 3 ratio of hydrido to methyl groups. In addition, a $^1$H-NNR was recorded from the resin using a standard (cyclohexane) to determine the unit ratios of the resin: M'/M=0.7 and (M+M')/(D+T+Q)=0.9. Using the $^{29}$Si(IG) NMR spectroscopy, the functional units were assigned to the signals as described in formula (I): M units 12.3 ppm, M' units −2.0 ppm, D units −17.1 ppm, T units −100.5 ppm, and Q units −108.0 ppm. In addition, an M'/M ratio of 0.6 and an (M+M')/(D+T+Q) ratio of 0.9 were determined via integration of the signals. Gel permeation chromatography (GPC) determined the average molecular weights of $M_n$=7060 g/mol and $M_w$=8473 g/mol and a PDI of 1.20. The silicone resin possessed a softening point of 152.7 to 203.9° C.

B. Crosslinking Reaction

The silicone resins of formula (I) are crosslinked with the silicone oils of formula (II) via a platinum-catalyzed hydrosilylation reaction. Hydrosilylation reactions of this type are known and the reaction conditions can be specified analogously. The person skilled in the art can be guided here, for example, by U.S. Pat. No. 5,684,112 A.

Specifically, in initial tests, elastic moldings could be produced by crosslinking the prepared silicone resins with silicone oils that had terminal vinyl groups. In addition to the silicone oils, the crosslinker solutions contained a Karstedt catalyst (CAS 68478-92-2; product number SIP6830.3 from Gelest, Inc.) and a nonpolar solvent such as toluene, xylene, 1-heptanol, cyclohexanone or pentylacetate. Crosslinking to generate specimens was performed in 30 to 60 seconds at 50° C. to 80° C. In addition, printing of multilayer molded bodies was also successful at room temperature when the crosslinker solution was introduced into a powder bed using a microdispensing system. The elasticity could be adjusted via the chain length of the silicone fluids. Silicone fluids with a molar mass of 800 to 28,000 g/mol were used. In addition, additives such as fumed $SiO_2$ (such as SIS6962.0 and SIS6960.0 from Gelest, inc.) were used to improve the mechanical properties of the specimens. Mass fractions of 0-60 wt. % of the fumed $SiO_2$ were used in conjunction with the silicone resins prepared.

The powdered silicone resin is spread layer by layer and linked by means of the crosslinker solution. This results in a significantly faster and less expensive process for 3D printing elastic objects compared to known processes.

The silicone resin used was converted into small (diameter approx. 2-25 μm) spherical particles by spray drying. The spray drying system B-290 and Inert Loop B-295 from BÜCHI Labortechnik GmbH were used for spray drying. The following parameters were selected: $T_{inlet}$=100-180° C., product/solution flow rate=5 to 30 mL/min, product concentration of ethyl acetate solution=8-65%, $N_2$ flow=300-700 L/h, aspirators=20-35 m³/h. As a result, $t_{outlet}$=40-90° C. was achieved. It was aimed that the $t_{outlet}$ was below the softening point of the sprayed resin. By varying the solution composition, inlet temperature, flow rate of the aspirator, $N_2$-flow, the shape and size of the particles obtained can be targeted. For example, by increasing the concentrations and increasing the inlet velocities of the silicone resin solution and decreasing the $N_2$ flow, larger particles can be obtained.

In addition, parameters such as the size of the spray nozzle also have an influence on the texture of the silicone resin powder.

For example, a 30% silicone resin ethyl acetate solution was spray dried at 100° C. inlet temperature, 46° C. outlet temperature, 30 m³/h flow rate of the aspirator, 400 L/h $N_2$ flow and 7.4 mL/min feed rate of the solution. Microscopy confirmed a spherical nature of the silicone resin with diameters ranging from 2 to 20 μm.

For the crosslinking tests, various crosslinker solutions were prepared consisting of 80-98 wt. % of silicone oil DMS-V05, -V21, -V22, -V25 or -V31 (CAS 68083-19-2) from Gelest, Inc., 2-20 wt. % of toluene or xylene and 0.01-1.5 wt. % of Karstedt catalyst solution SIP6830.3 from Gelest, Inc. Ethanol at the same concentration could also be used instead of the above non-polar solvents, resulting in a dispersion. The SIP6830.3 consisted of 3% from the Karstedt catalyst, >90% from a long-chain dimethylpolysiloxane with terminal vinyl groups, and <5% divinyltetramethyldisiloxane. Thus, the Karstedt catalyst content of the crosslinker solutions ranges from 5 to 450 ppm. Specimens were obtained from 50-70 wt. % (for example 1000 mg) of the crosslinker solutions in combination with 30-50 wt. % (for example 800 mg) of a powder mixture consisting of 40-100 wt. % (for example 600 mg) of the prepared silicone resin and 0-60 wt. % (for example 200 mg) of an additive (for example pyrogenic $SiO_2$). Temperatures of 20-80° C. were used. In addition, colored sample bodies could also be obtained by adding pigments such as the inorganic pigments (for example PS 22-5091 PK Pigment Blue, PS 24-3095 PK Pigment black, PS 21-4301 Ni free Pigment green from Ferro GmbH, Bayferrox 318 M, Bayferrox 318 M from Lanxess Deutschland GmbH and Heucodur Yellow 8G (P) from Heubach GmbH). Either 0.1 to 5 wt. % of the respective pigment was added to the crosslinker solution or to the powder mixture.

In addition, the first multilayer elastic moldings were printed at room temperature using microdispensing systems (MDS 3020$^+$ and MDS 1560 from VERMES Microdispensing GmbH). In this process, a crosslinker solution was applied to the silicone resin in the powder bed in 10-250 μg dosage amounts at droplet intervals of 0.5-1.2 mm. The powder was spread in layer thicknesses of 0.2-1.2 mm. Elastic specimens with dimensions of, for example, 15×15×1 mm were produced. Crosslinking was additionally accelerated by irradiation of a 250 W IR lamp (thermal post-treatment). Each layer was either irradiated individually or only after several layers.

EXAMPLE B1

A 30% ethyl acetate solution was prepared from the silicone resin prepared in Example A1 and spray dried at 100° C. inlet temperature, 46° C. outlet temperature, 30 m³/h flow rate of the aspirator, 400 L/h $N_2$ flow and 7.4 mL/min feed rate of the silicone resin solution. Microscopy was used to confirm a spherical nature of the silicone resin with diameters ranging from 2 to 20 μm. For the crosslinking test, a crosslinker solution (D2) consisting of 89.9 wt % DMS-V22, 9.5 wt % toluene and 0.60 wt % SIP6830.3 was prepared. 80 mg of the spray-dried silicone resin was combined with 150 mg of the D2 in a vial. The vial was heated to 50° C. for 30 sec. The resulting sample body was removed from the vial. Some silicone resin was still present under the specimen, as the crosslinker solution reacted very rapidly with the resin, forming an impermeable layer for further crosslinker solution to remain on the specimen.

Excess silicone resin and crosslinker solution were removed, resulting in a rather smooth, elastic and dimensionally stable specimen by trapping some small gas bubbles. Using a Shore durometer, a Shore hardness of 25 Shore A was determined.

EXAMPLE B2

The same spray-dried resin as in Example B1 was used. A crosslinker solution (D3) consisting of 89.4 wt. % DMS-V25, 10.0% toluene and 0.61 wt. % SIP6830.3 was prepared. 110 mg of the spray-dried silicone resin was combined with 240 mg of the D3 in a vial. The further procedure was the same as in Example B1. Also, a small portion of the resin and the crosslinker solution was present uncrosslinked after the specimen was bound. A significantly more elastic specimen was obtained than in Example B1. Using a Shore durometer, a Shore hardness of 20 Shore A was determined. Thus, in comparison of example B1 to B2, a higher elasticity was obtained by using a crosslinker solution based on a linear dimethylpolysiloxane with terminal vinyl groups, which had a larger molar mass.

EXAMPLE B3

A 40% ethyl acetate solution was prepared from the silicone resin prepared in Example A4 and spray dried at 170° C. inlet temperature, 71° C. outlet temperature, 30 m³/h flow rate of the aspirator, 450 L/h N$_2$ flow and 16.2 mL/min feed rate of the silicone resin solution. Microscopy was used to confirm a spherical nature of the silicone resin with diameters ranging from 5 to 30 μm. A powder (P1) was prepared, which consisted of 75% by weight of the silicone resin powder and 25% by weight of fumed SiO$_2$ (SIS6962.0 from Gelest, Inc.). A crosslinker solution (D4) consisting of 94.8 wt % DMS-V21, 5.1% pentyl acetate and 0.09 wt % SIP6830.3 was also prepared. In a mold made of Teflon, 800 mg of P1 was mixed with 1000 mg of D4 and cured for 1 min at 80° C. A very elastic and tensile specimen with a Shore hardness of 38 Shore A was obtained.

EXAMPLE B4

To the crosslinker solution D4, 1 wt. % of the pigment PS 21-4301 Ni-free Green from Ferro GmbH was added and mixed well. A specimen was prepared from the pigmented D4 in combination with P1, as in Example B3. A green specimen with comparable mechanical properties to the specimen from Example B3 was obtained.

EXAMPLE B5

The P1 described in Example B3 was used in a powder bed 3D compression test setup. The powder was spread to a visible thickness of 0.3 mm. Then, using the Microdispensing System 1560 from VERMES Microdispensing GmbH, the crosslinker solution D4 was introduced in a drop weight of 150 μg with a drop spacing of 1 mm, so that an area of 15×15 mm of the powder was provided with the crosslinker solution. The spreading and dispensing procedure was repeated three more times so that a four-layer elastic specimen (cuboid with dimensions 15×15×1 mm) was produced. Using a 250 W IR lamp, the specimen was irradiated for 1 min (thermal post-treatment) to ensure complete crosslinking. Subsequently, the non-crosslinked powder was removed and the specimen was removed from the build platform. The specimen was then washed with ethanol to remove the remaining excess powder.

The invention claimed is:

1. A powder bed 3D printing method for production of elastic molded bodies from silicones, the method comprising:
a) layer by-layer spreading a powder in a powder bed 3D apparatus, wherein the powder comprises a silicone resin of formula (I):

$$M_y M'_z D_a T_b Q_c \quad (I)$$

with
$M=[R_3SiO_{1/2}]$,
$M'=[R'R_2SiO_{1/2}]$,
$D=[R_2SiO_{2/2}]$,
$T=[RSiO_{3/2}]$, and
$Q=[SiO_{4/2}]$
wherein each R is independently C1-C10 alkoxy, C1-C10 alkyl C6-C10 aryl or hydroxy, and
$R'=H$
and where for the indices
y=0 to 400,
z=2 to 440,
a=0 to 60,
b=0 to 40,
c=6 to 400,
400≥a+b+c≥9, and
(z+y)/(a+b+c)=0.3 to 1.1;
b) applying a crosslinker solution to the layer of a) according to a printing pattern for the elastic molded article, wherein the crosslinker solution comprises a hydrosilylation catalyst and a silicone oil of the general formula (II):

$$M_a M'_b D_c D'_d \quad (II)$$

with
$M=[R_3SiO_{1/2}]$,
$M'=[R'R_2SiO_{1/2}]$,
$D=[R_2SiO_{2/2}]$,
$D'=[R'RSiO_{2/2}]$,
wherein each R is independently C1-C10 alkyl or C6-C10 aryl, and
R' stands for vinyl
and where for the indices
a=0 to 2,
b=0 to 2,
c=8 to 500,
d=0 to 20,
a+b=2, and
b+d≥2;
c) repeating a) and b) according to the printing pattern for the elastic molded body; and
d) removing of the non-crosslinked powder.

2. The method of claim 1, wherein, in a silicone resin of formula (I) is used, wherein R is methyl and/or ethoxy.

3. The method of claim 1, wherein, in a silicone resin of formula (I) is used, wherein y=0 to 200, z=2 to 220, a=0 to 30, b=0 to 20, c=6 to 200, 200≥a+b+c≥9, z/y=0.2 to 10, and/or (z+y)/(a+b+c)=0.3 to 1.0.

4. The method of claim 1, wherein, in a), the powder comprising the silicone resin of formula (I) has an average particle diameter D50 ranging from 5 to 250 μm used.

5. The method of claim 1, wherein, in a), R in the silicone oil of formula (II), is methyl.

6. The method of claim 1, wherein, in a), for the silicone oil of formula (II), d=0 and b=2 and/or c=50 to 250.

7. The method of claim 1, wherein, in a), the silicone oil of formula (II) has an average molecular weight in the range of 3000 to 30000 g/mol.

8. The method of claim 1, wherein, in b), 1,1,3,3-tetramethyl-1,3-divinyldisiloxane platinum is used as hydrosilylation catalyst.

9. The method of claim 1, wherein, in the repeating a), powders with different compositions and/or, in the repeating b), crosslinker solutions with different compositions are used.

10. A powder containing a silicone resin of the formula (I):

$$M_y M'_z D_a T_b Q_c \quad (I)$$

with
M=[R$_3$SiO$_{1/2}$],
M'=[R'R$_2$SiO$_{1/2}$],
D=[R$_2$SiO$_{2/2}$],
T=[RSiO$_{3/2}$], and
Q=[SiO$_{4/2}$],
where each R is independently C1-C10 alkoxy, C1-C10 alkyl, C6-C10 aryl or hydroxyl, and
R'=H
and where for the indices
y=0 to 400,
z=2 to 440,
a=0 to 60,
b=0 to 40,
c=6 to 400,
400≥a+b+c≥9, and
(z+y)/(a+b+c)=0.3 to 1.1.

* * * * *